United States Patent [19]

Kassai

[11] Patent Number: 4,618,033
[45] Date of Patent: Oct. 21, 1986

[54] WHEEL STOPPING DEVICE

[75] Inventor: Kenzou Kassai, Osaka, Japan

[73] Assignee: Aprica Kassai Kabushikikaisha, Osaka, Japan

[21] Appl. No.: 803,069

[22] Filed: Nov. 27, 1985

[30] Foreign Application Priority Data

Dec. 6, 1984 [JP] Japan ................... 59-258809

[51] Int. Cl.⁴ ................................ B62B 9/08
[52] U.S. Cl. ........................ 188/20; 280/642
[58] Field of Search .......... 188/20, 31, 2 D, 2 F, 188/16, 19, 21–23, 24.11, 24.16, 46, 105, 106 R, 112, 346, 141, 265, 60, 204, 217; 280/642, 47, 38, 644, 643

[56] References Cited

U.S. PATENT DOCUMENTS

| | | | |
|---|---|---|---|
| 2,474,804 | 6/1949 | Schwarzbaum | 188/20 |
| 2,480,431 | 8/1949 | Welsh | 188/20 |
| 2,480,570 | 8/1949 | Goldberg | 188/20 X |
| 2,859,837 | 11/1958 | Mize | 188/20 X |
| 3,248,125 | 4/1966 | Gill | 188/20 X |
| 3,279,754 | 10/1966 | Rizzuto | 188/20 X |
| 4,567,964 | 2/1986 | Kassai | 188/20 |

FOREIGN PATENT DOCUMENTS 0042347 12/1981 European Pat. Off. ........... 280/643

*Primary Examiner*—Douglas C. Butler
*Attorney, Agent, or Firm*—W. G. Fasse; D. H. Kane, Jr.

[57] ABSTRACT

Two sets of rear wheels (9, 10 and 11, 12) have ribs (66, 67, 167) adapted to be engaged by a respective engaging member (57, 157) to establish a wheel stopped state. The engaging member (57, 157) are moved by the turning of their respective engaging levers (17, 117). The turning of one engaging lever (17) is brought about by the turning of the operating member (13), whereby a wire (49) is also moved so as to turn the other engaging lever (117). An overtension accommodating spring (111) is connected between the wire (49) and the engaging lever (117), so that excessive tension is prevented from being imposed on the wire.

12 Claims, 36 Drawing Figures

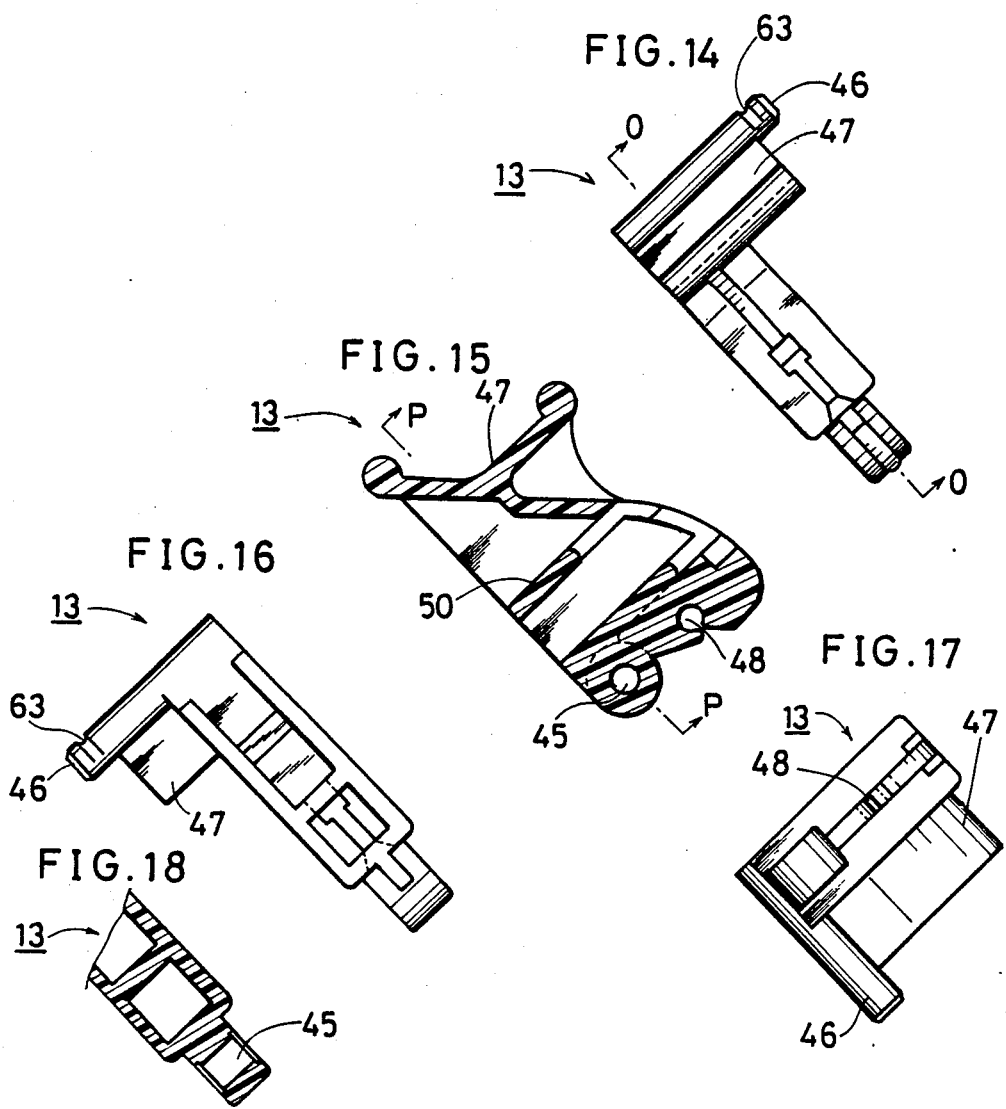

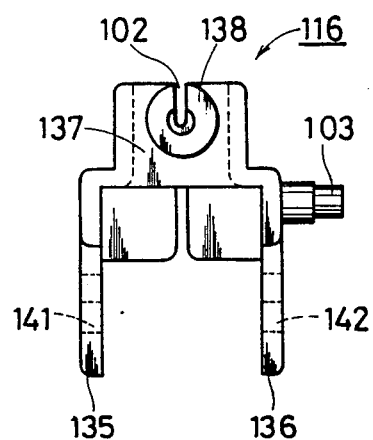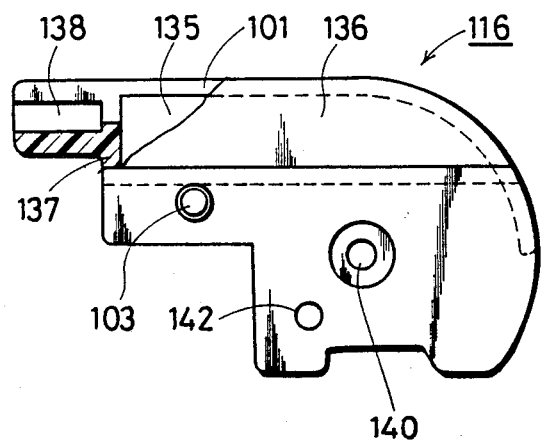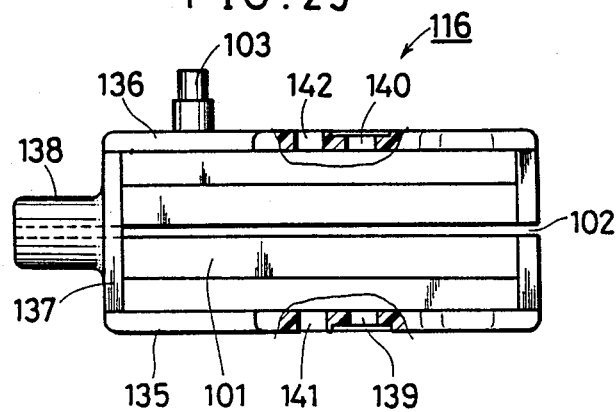

WHEEL STOPPING DEVICE

BACKGROUND OF THE INVENTION

This invention relates to a wheel stopping device and particularly to improvements in a wheel stopping device designed to be attached to wheels of a baby carriage, for example, and selectively maintain the stopped state.

A baby carriage, for example, is desirably provided with a wheel stopping device whereby the baby carriage is inhibited from starting to move under its own weight as on a sloping road. It is desired that such wheel stopping device, which is manipulated according to the need, be simple in operation. Further, the wheel stopping device is closely related to the safety of baby carriages, and it is desirable that it be constructed so that with respect to baby carriage wheels disposed at two different places, e.g., right and left rear wheels, the device is capable of maintaining the stopped state of the wheels. This is even a legal obligation in some countries.

In the case where the wheel stopping device is constructed to act on wheels disposed at two different places, it is desirable if two such wheel stopping mechanisms disposed at two places can be simultaneously actuated in one operation. When two stopping mechanisms at two places are to be simultaneously actuated, a solution would be to connect them together by a suitable interlocking mechanism. However, if such wheel stopping device is attached to a collapsible baby carriage, the positional relation between the two wheel stopping mechanisms can change with the collapsing operation. In such case, the interlocking mechanism connecting the two wheel stopping mechanisms can interfere with the collapsing movement of the baby carriage; thus, some measure or other must be taken also for such interlocking mechanism.

The simplest method of maintaining the stopped state of wheels is to insert an engaging member between spokes which are originally provided on many wheels. In such case, the engaging member will be movably installed for selective attainment of two states: one in which it is inserted between spokes and the other in which it is separated from spokes. This, however, cannot always be attained easily in the case of the so-called double wheel if such manner of movement of the engaging member is employed. In addition, by the double wheel is meant two wheels arranged parallel to each other at one place. Therefore, two double wheels will be provided at two different places. In such case, it is desirable that two engaging members are so designed that they simultaneously act each on two wheels included in a double wheel associated therewith. The reason is that if it comes to a double wheel it is advantageous from the standpoint of safety to bring both wheels into their stopped state. And when two engaging members are to be disposed with respect to a double wheel, it would seem desirable to position them between the wheels. However, where the two engaging members are disposed between the two wheels, the engaging members have to be so installed that they are movable in opposite directions. This requirement complicates the mechanism for simultaneously actuating the two engaging members.

SUMMARY OF THE INVENTION

Accordingly, an object of the invention is to provide a wheel stopping device wherein in the case where wheel stopping mechanisms are installed at two different places on such a movable body as a baby carriage, the stopping mechanisms at two places are designed to be simultaneously actuated in one operation and wherein an interlocking mechanism for such stopping mechanisms at two places is designed not to interfere with changes in the relative positional relation between two wheels which are brought about by the collapsing movement of a baby carriage, for example.

Another object of the invention is to provide a wheel stopping device wherein the engaging member and the arrangement associated with wheel means to be engaged thereby are improved so that even if said wheel means is a double wheel, the two wheels can be brought into their stopped state without having to impart a complicated movement to the engaging member.

A further object of the invention is to provide a wheel stopping device wherein an interlocking mechanism protected against damage which, when one of the wheel stopping mechanisms is actuated in one operation, would otherwise be caused by a difficulty with the movement of the other wheel stopping mechanism actuated through the interlocking mechanism.

According to this invention, there is provided an arrangement whereby first and second wheel means rotatably installed at two different places on a movable body through first and second wheel attaching members and respectively having at least one wheel are simultaneously brought into the stopped state or the rotation permitted state in one operation. The wheels included in the first and second wheel means are respectively formed with first and second ribs projecting from the lateral surfaces thereof. Associated with the first and second wheel means, first and second engaging members are installed for movement relative to the respective wheel attaching members. The stopped state is obtained when the first and second engaging members respectively engage the first and second ribs. On the other hand, the rotation permitted state is obtained when the first and second engaging members become incapable of engagement with the first and second ribs, respectively. Added to such basic arrangement are the following characteristic arrangements.

The first and second ribs project from the lateral surfaces of the respective wheels and extend along radially outward portions of the respective wheels. The first and second engaging members are formed on the respective ends of first and second engaging levers which are supported for turning movement within a predetermined range on the first and second wheel attaching members, respectively. Therefore, it follows that the first and second engaging members are disposed for movement only radially of the wheels, said radial movement providing states of engagement with and disengagement from the ribs. The first engaging member is urged by a return spring to be positioned at one end of the range of its movement. A wire is provided for pulling the first engaging member against the force of said return spring to position it at the other end of its range of movement. This wire forms a main portion of the interlocking mechanism. The wire is connected to the first engaging member through a spring which accommodates overtension in the wire. The second wheel attaching member has an operating member attached thereto so that it is rotatable within a predetermined range. Said wire extends through a tube fixed at its opposite ends to the first and second wheel attaching members and is connected to the operating member. A locking spring is connected between the operating member and the second engaging lever which are attached to the same second wheel attaching member. The operating member and the second engaging lever are urged to turn in opposite directions across their dead position by the action of the locking spring. The relation between the operating member under the action of said locking spring and the return spring associated with the turning of the second engaging lever is such that the turning of the operating member and second engaging lever in one direction is effected against the force of the return spring while their turning in the opposite direction is effected with the force of the return spring assisting in their turning. The positional relation between the first and second engaging members and the associated ribs is such that the engagement of the first engaging member with the first ribs and its disengagement therefrom are effected in operative association with the engagement of the second engaging member with the second ribs and its disengagement therefrom, respectively.

In this invention, an external operation is imparted to the operating member, whereupon the first and second engaging members disposed at different places are actuated in an operatively associated relation by the wire. That is, when the operating member is turned in the predetermined direction, the first engaging member is actuated through the wire connected to said operating member. Since the overtension accommodating spring is connected between the wire and the first engaging lever forming the first engaging member, if there is an obstacle in the path of travel of the first engaging member as the latter is drawn by the wire, the elongation of the overtension accommodating spring will prevent the wire from having overtension imposed thereon. An encounter with such obstacle in the path of travel of the first engaging member is a collision between the first engaging member and the first ribs which could take place depending upon the rotative angle of the wheels. Such obstacle can be removed by slightly rotating the wheels, and as soon as the first engaging member ceases to collide with the first ribs, the overtension accommodating spring is actuated to enable the first engaging member to engage the first ribs.

Further, the turning of the operating member results in the locking spring turning the second engaging lever which forms the second engaging member. At the respective terminal ends of the turning of the operating member and second engaging lever, the attitudes of the operating member and second engaging lever are held stable by the action of the locking spring. The link system comprising the first engaging lever, overtension accommodating spring, wire and operating member is constantly subjected to the action of the return spring; the movement of this link system in one direction is effected against the force of the return spring and its movement in the other direction is effected by help of the force of said return spring.

The first and second engaging members, at one end of their travel radially of the wheels, are brought into engagement with the first and second ribs, respectively, and at the other end they are disengaged therefrom. Therefore, in accordance with such travel of the engaging members, there are obtained wheel stopped and rotation permitted states.

As described above, according to the invention, since wheel stopping mechanisms installed at two different places are interlocked by a wire, simply operating a single operating member installed at one of the two places makes it possible to simultaneously actuate both wheel stopping mechanisms. As a result, the operation on such wheel operating mechanisms disposed at two places for obtaining a wheel stopped and wheel rotation permitted state is simplified. Further, since it is a wire that interlocks the two wheel stopping mechanisms, it is possible by utilizing the flexibility of the wire to use such wire without any trouble even if the movable body is such that the relative positions of the two wheel means will change. For example, this invention is advantageously applicable to a collapsible baby carriage. Further, since the ribs to be engaged by the engaging member are provided on a portion of the radius of each wheel, states for engagement with and disengagement from the ribs can be obtained by radially moving the engaging member. Such radial movement of the engaging members can be attained by a relatively simple arrangement and, moreover, even double wheels can be simultaneously stopped in a simple manner.

These object and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an external view taken from the left-hand side, FIG. 4 is an external view taken from the right-hand side, FIG. 5 is a sectional view taken from the left-hand side, and FIG. 6 is a sectional view taken from the left-hand side, showing the wheel stopped state;

FIG. 7 is a plan view, FIG. 8 is a front view, FIG. 9 is a sectional view taken along the line M—M in FIG. 8, and FIG. 10 is a sectional view taken along the line L—L in FIG. 7;

FIG. 11 is a left-hand side view, FIG. 12 is a sectional view taken along the line N—N in FIG. 11, and FIG. 13 is a bottom view;

FIGS. 14 through 18 singly show an operating member 13, FIG. 14 is a plan view, FIG. 15 is a sectional view taken along the line O—O in FIG. 14, FIG. 16 is a bottom view, FIG. 17 is a right-hand side view, and FIG. 18 is a fragmentary sectional view taken along the line P-P in FIG. 15;

FIG. 19 is a plan view, FIG. 20 is a front view, and FIG. 21 is a right-hand side view;

FIG. 23 is an external view showing the wheel rotation permitted state, FIG. 24 is a sectional view showing the wheel rotation permitted state, FIG. 25 is a sectional view showing the wheel stopped state, and FIG. 26 is a sectional view showing a special state obtained on the way from the wheel rotation permitted state to the wheel stopped state;

FIGS. 27 through 29 singly show a left-hand side wire guide member 116, FIG. 27 is a left-hand side view, FIG. 28 is a front view, and FIG. 29 is a bottom view;

FIG. 30 is a plan view, FIG. 31 is a front view, and FIG. 32 is a left-hand side view; FIG. 33 is a left-hand side view, FIG. 34 is a front view, FIG. 35 is a right-hand side view, and FIG. 36 is a sectional view taken along the line Q—Q in FIG. 34.

DESCRIPTION OF THE PREFERRED EMBODIMENTS

The wheel stopping device of this invention is applicable to various types of baby carriages and to any other movable bodies provided that such movable body has wheels at at least two places. In addition, the embodiment to be described below is an example in which the invention is applied to a baby carriage having two rear legs.

Figure 1:
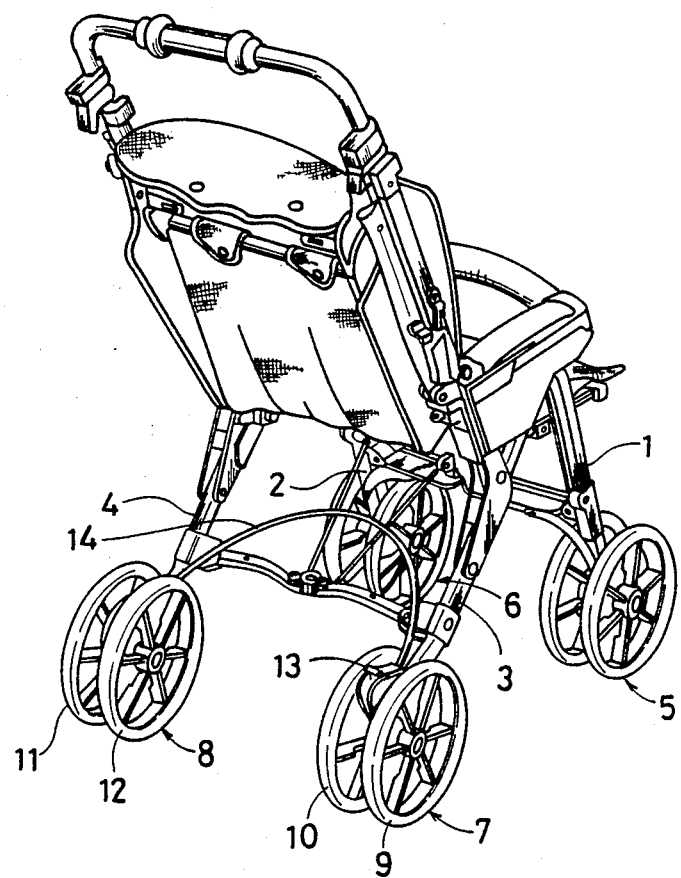
FIG. 1 is a perspective view taken from the back of a baby carriage shown as an example of a movable body to which the invention is advantageously applicable.

FIG. 1 is a perspective view taken from the back of such baby carriage. This baby carriage has two front legs 1 and 2 and two rear legs 3 and 4. Rotatably mounted on the lower ends of the front legs 1 and 2 and rear legs 3 and 4 are front wheel means 5 and 6 and rear wheel means 7 and 8, respectively, formed of double wheels. In such baby carriage, the wheel stopping device can be installed in connection with two wheel means selected from the four wheel means 5 through 8. For example, the wheel stopping device is applicable to the right and left front wheel means 5 and 6, or the right and left rear wheel means 7 and 8, or a combination of either the right or the left front wheel means 5 or 6 and either the right or the left rear wheel means 7 or 8. In addition, for the convenience of operation it is preferable to install the wheel stopping device in connection with the rear wheel means 7 and 8 mounted on the rear legs 3 and 4. Thus, in this embodiment, the wheel stopping device is provided in connection with the two rear wheel means 7 and 8.

FIG. 1 shows some of the components of the wheel stopping device. For example, an operating member 13 is in sight, projecting from between outer and inner wheels 11 and 12 included in the right-hand side rear wheel means 7. Further, a flexible tube 14 for encasing a wire extends from between the outer and inner rear wheels 9 and 10 of the right-hand side wheel means 7 to between the outer and inner rear wheels 11 and 12 of the left-hand side wheel means 8.

Figure 2:
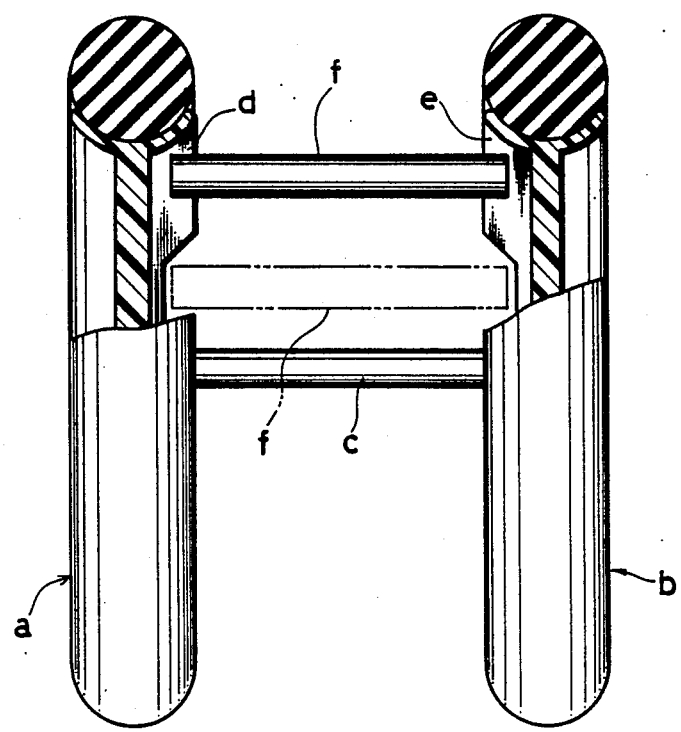
FIG. 2 is a view diagrammatically showing the relation between an engaging member f and ribs d and e, which cooperate with each other to establish wheel stopped and wheel rotation permitted states.

FIG. 2 and the following shown in the drawings attached to the specification will now be outlined. FIG. 2 shows an arrangement applicable to both of the right and left rear wheel means 7 and 8, diagrammatically showing how an engaging member engages ribs. FIGS. 3 through 21 are views for explaining a wheel stopping mechanism installed in connection with the right-hand side wheel means. FIG. 22 is a front view showing a wire which forms a main component of an interlocking mechanism. FIGS. 23 through 36 are views for explaining a wheel stopping mechanism provided in connection with the left-hand side wheel means 8. These right and left wheel stopping mechanisms are actuated in operatively associated relation by the operation of the operating member 13 disposed at right, so as to establish wheel stopped and wheel rotation permitted states.

Referring to FIG. 2, the arrangement for establishing said wheel stopped and wheel rotation permitted states will now be described as to its principle. In FIG. 2, a double wheel is shown partly broken away. Two wheels a and b disposed parallel to each other are rotatably supported on the opposite ends of a single axle c. The respective inner lateral surfaces of the wheels a and b are formed with ribs d and e projecting only from radial portions. In this example, the ribs d and e are provided on the radially outward portion of the associated wheels a and b. On the other hand, an engaging member f extending between the wheels a and b is held by a suitable fixed portion and is adapted to move between a solid line position and a phantom line position. That is, the engaging member f is movable only radially of the wheels a and b.

When the engaging member f is positioned on the outward portions of the wheels a and b, as shown in solid lines, the wheel stopped state is obtained. That is, the opposite ends of the engaging member f enter the paths of travel of the ribs d and e which are brought about by the rotation of the wheels a and b, thereby enabling the engaging member f to engage the ribs d and e. On the other hand, when it is positioned on the inward portions of the wheels a and b, as shown in phantom lines in FIG. 2, the wheel rotation permitted state is obtained. In this state, the engaging member f is outside the paths of travel of the ribs d and e which are brought about by the rotation of the wheels a and b, so that the engaging member f cannot engage the ribs d and e.

The embodiment described below utilizes the principle illustrated in FIG. 2. If the fact that the right and left wheel stopping mechanisms are interconnected by the wire is kept in mind, they may be independently described. Thus, in the following description, the right-hand side wheel stopping mechanism will be described first and then the left-hand side wheel stopping mechanism will be described.

Figure 3:
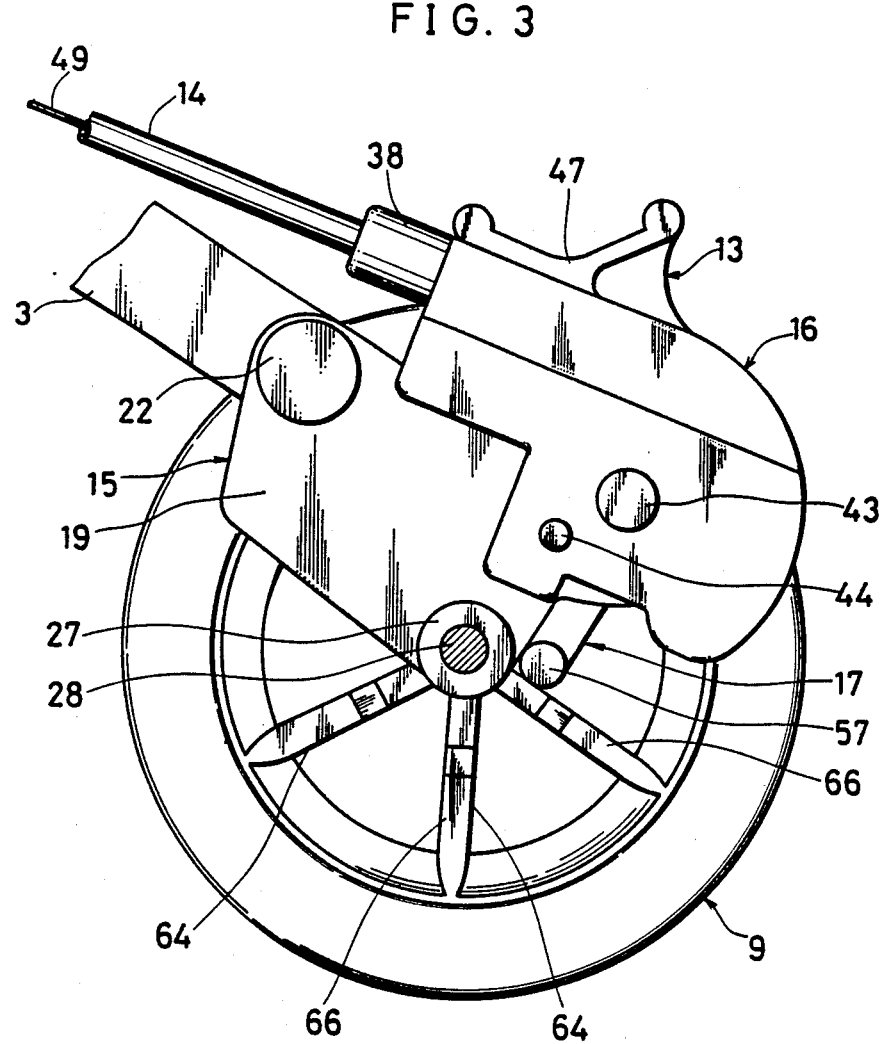
FIGS. 3 through 6 show a right-hand side wheel stopping mechanism installed in connection with right-hand side rear wheel means 7 shown in FIG. 1, FIGS. 3 through 5 show the wheel rotation permitted state, particularly
Figure 4:
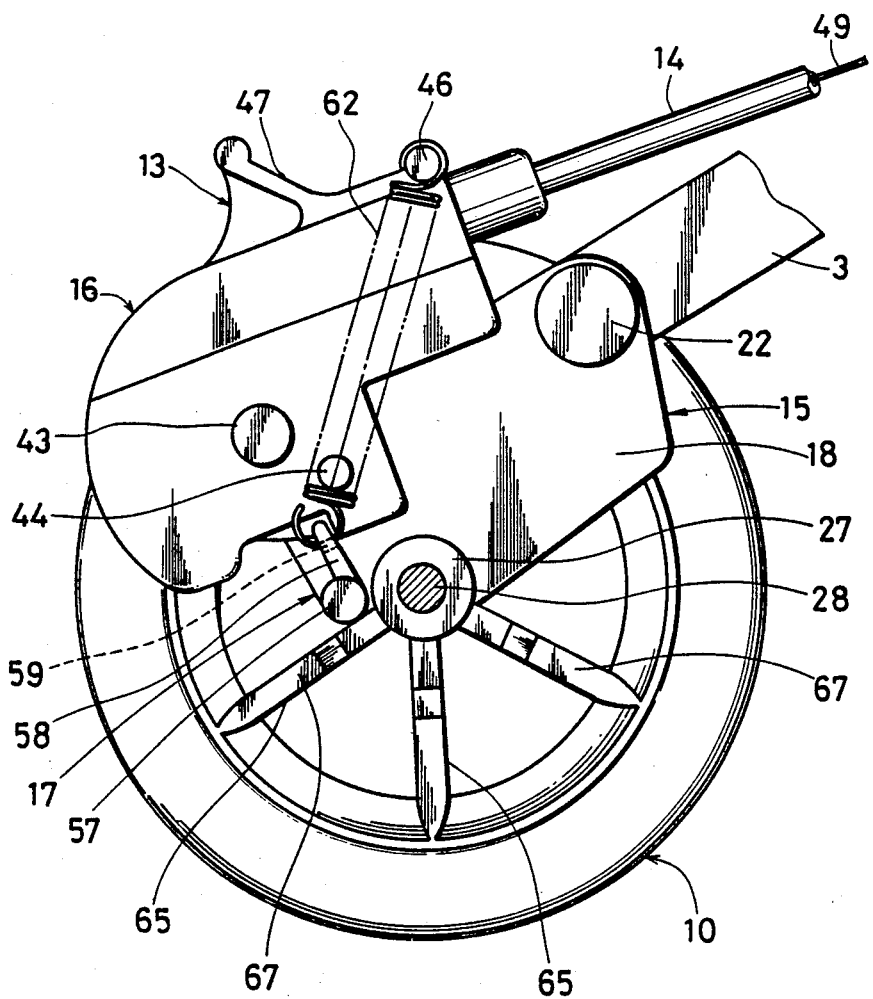
Figure 5:
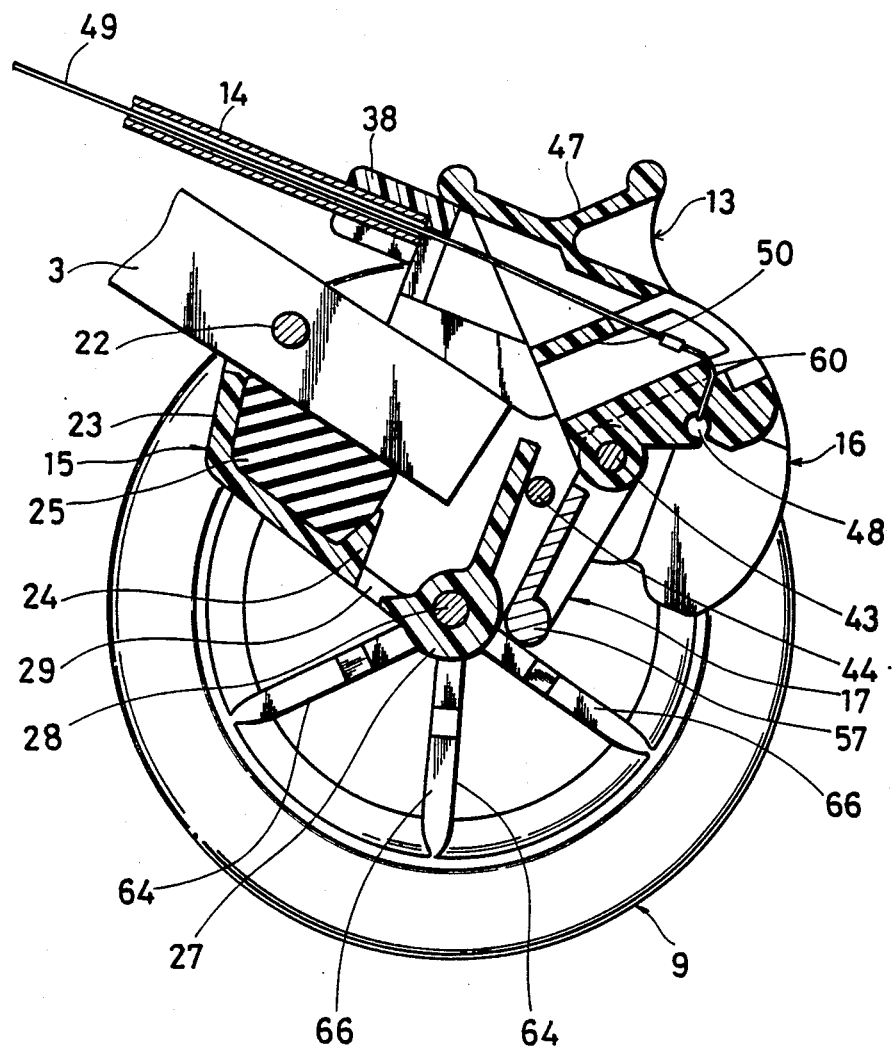
Figure 6:
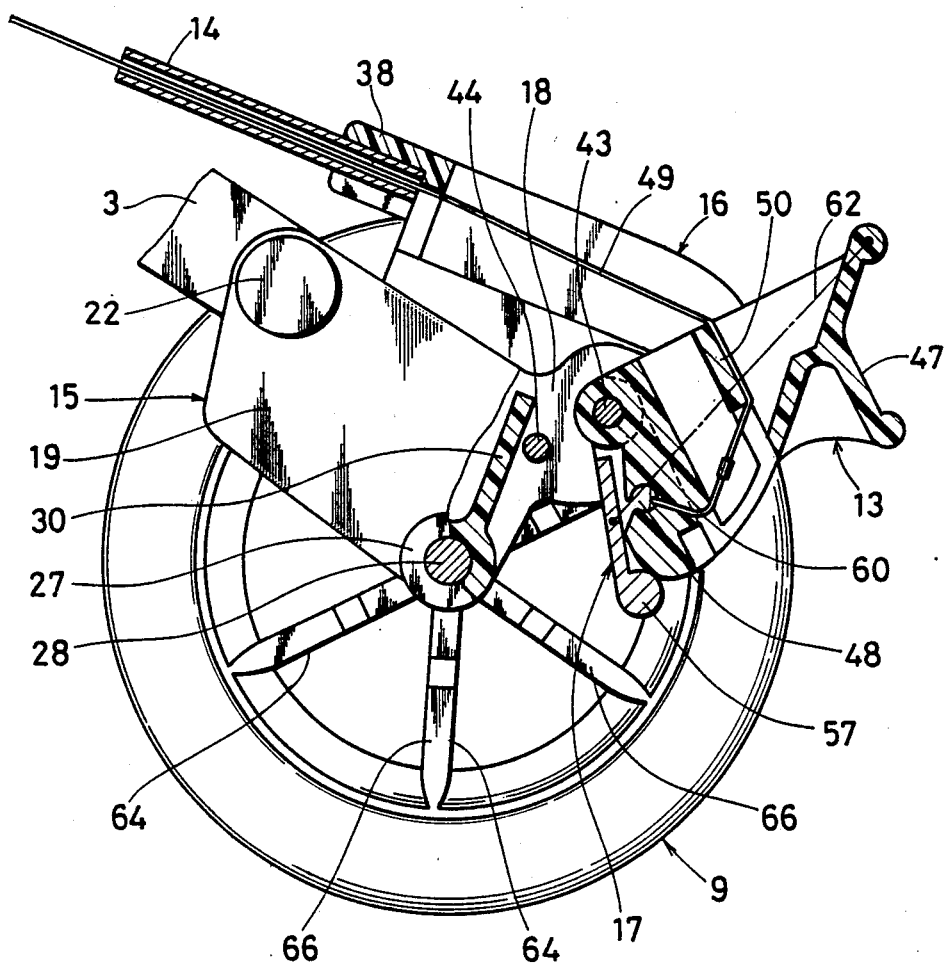

FIGS. 3 through 5 show the wheel rotation permitted state, and FIG. 6 shows the wheel stopped state. In addition, for clear illustration, the wheel stopping mechanism is shown with the inner rear wheel 10 removed in FIGS. 3, 5 and 6 and with the outer rear wheel 9 removed in FIG. 4.

The right-hand side wheel stopping mechanism comprises, as main components, a wheel attaching member 15 attached to the right-hand side rear leg 3, a wire guide member 16, an engaging lever 17 and the aforesaid operating member 13, said components 16, 17 and 13 being attached to said wheel attaching member 15.

Figure 7:
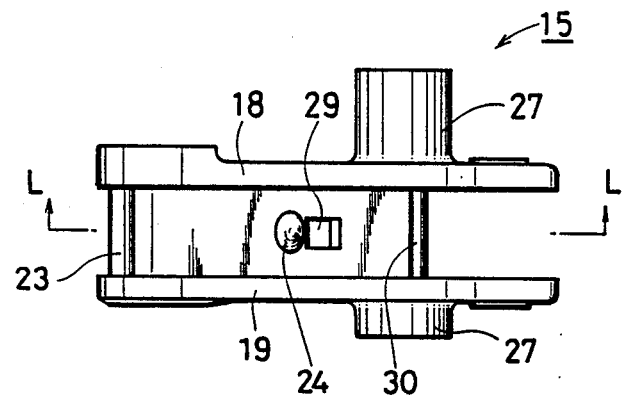
FIGS. 7 through 10 singly show a right-hand side wheel attaching member.
Figure 8:
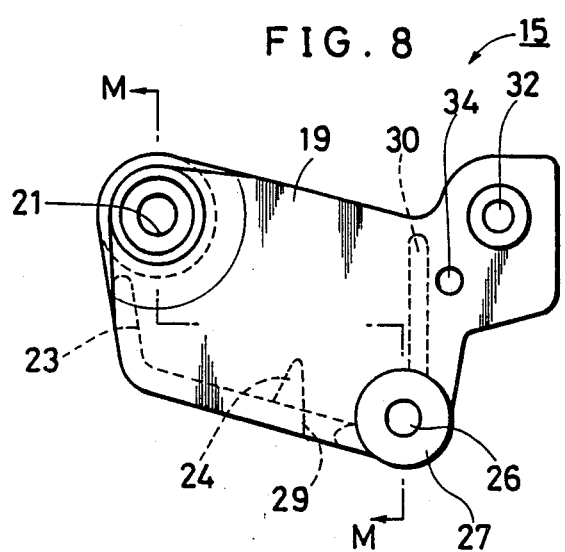
Figure 9:
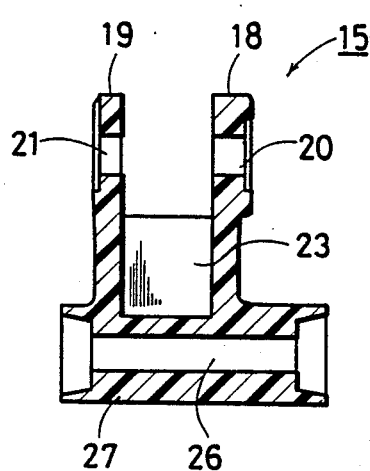
Figure 10:
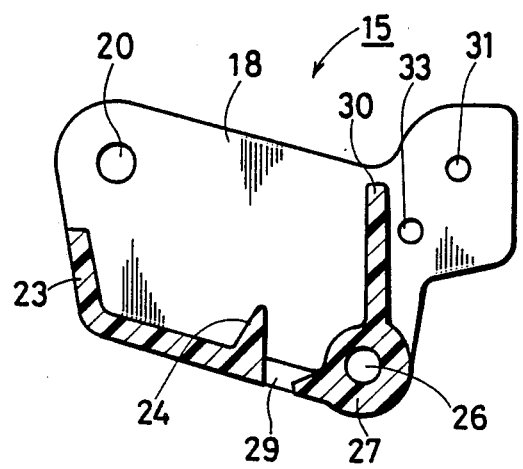

The wheel attaching member 15 is singly shown in FIGS. 7 through 10. FIG. 7 is a plan view; FIG. 8 is a front view; FIG. 9 is a sectional view taken along the line M—M in FIG. 8; and FIG. 10 is a sectional view taken along the line L—L in FIG. 7.

The wheel attaching member 15 has a pair of walls 18 and 19 for holding the rear leg 3 therebetween, said walls 18 and 19 being formed with throughgoing holes 20 and 21, respectively. The wheel attaching member 15 is turnably supported on the lower end of the rear leg 3 by a pin 22 (FIGS. 3 through 6) extending through said throughgoing holes 20 and 21. Its turning movement serves to provide a cushioning effect between the rear wheels 9, 10 and the rear leg 3. That is, as shown in FIG. 5, a cushion member 25 made of an elastic material, such as rubber, is disposed between the front wall 23 and projection 24 of the wheel attaching member 15 so that it abuts against the rear leg 3. Therefore, when the wheel attaching member 15 is turned counterclockwise around the axis of a pin 22, the cushion member 25 is compressed. This provides a cushioning effect.

The lower portion of the wheel attaching member 15 is formed with a bearing portion 27 having a laterally extending throughgoing hole 26. An axle 28 is inserted in the throughgoing hole 26 of the bearing portion 27. The axle 28 rotatably supports at its opposite ends the outer and inner rear wheels 9 and 10.

A drain hole 29 is formed forwardly of the bearing portion 27.

The rear portion of the wheel attaching member 15 is formed with a wall 30 which interconnects the walls 18 and 19. The walls 18 and 19 are formed with throughgoing holes 31, 32 and 33, 34, respectively, disposed rearwardly of the wall 30.

Figure 11:
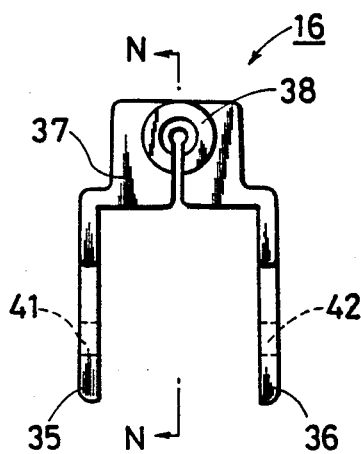
FIGS. 11 through 13 singly show a right-hand side wire guide member 16.
Figure 12:
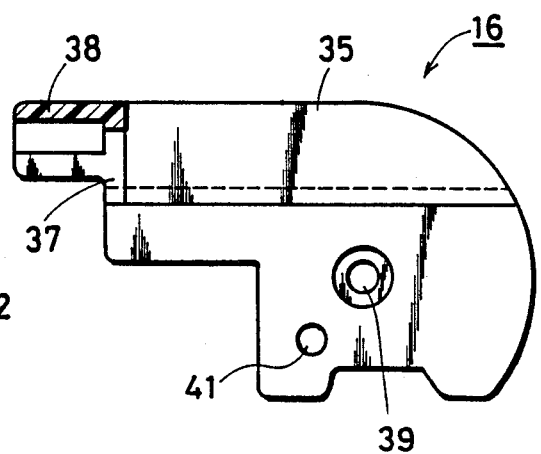
Figure 13:
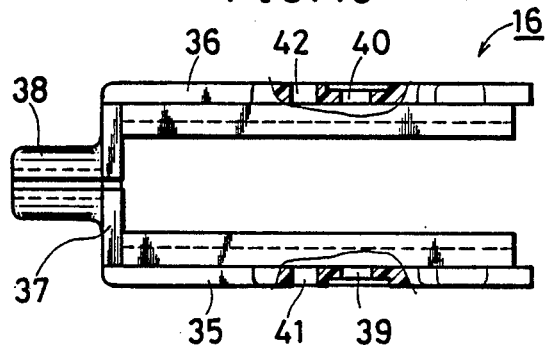

The wire guide member 16 is singly shown in FIGS. 11 through 13. FIG. 11 is a left-hand side view, FIG. 12 is a sectional view taken along the line N—N in FIG. 11, and FIG. 13 is a bottom view.

The wire guide member 16 has a pair of walls 35 and 36 for holding the aforesaid wheel attaching member 15 therebetween, and a front wall 37 for connecting said walls 35 and 36 together at their front ends, said front wall 37 being formed with a socket portion 38. The walls 35 and 36 are formed with throughgoing holes 39, 40 and 41, 42, respectively.

The wire guide member 16, as shown in FIGS. 3 and 4, is fixed to the wheel attaching member 15 in such a manner as to hold the wheel attaching member 15 between its walls 35 and 36. To this end, two pins 43 and 44 are inserted in the aligned throughgoing holes 41, 33, 34, 42 and the aligned throughgoing holes 39, 31, 32, 40, respectively.

The operating member 13 is singly shown in FIGS. 14 through 18. FIG. 14 is a plan view; FIG. 15 is a sectional view taken along the line O—O in FIG. 14; FIG. 16 is a bottom view; FIG. 17 is a right-hand side view; and FIG. 18 is a fragmentary sectional view taken along the line P—P in FIG. 15.

The operating member 13 is positioned as it is held between the rear portions of the walls 18 and 19 of the aforesaid wheel attaching member 15, it being rotatably supported by inserting said pin 43 in the throughgoing hole 45. The major part of the operating member 13 is held between the walls 35 and 36 of said wire guide member 16.

The front end portion of the operating member 13 is formed with a spring receiving shaft 46 projecting from one side. The spring receiving shaft 46 projects outward beyond the wall 35 of the wire guide member 16 (FIG. 4) when the operating member 13 is built in as a portion of the wheel stopping mechanism. In the state shown in FIG. 4, one terminal end of the range of turning movement of the operating member 13 is defined by the spring receiving shaft 46 abutting against the wall 35 of the wire guide member 16.

Actually, the operating member 13 will be operated by the foot. A wall 47 extending in V-shape to form an operating portion to be operated by the foot is formed on the front end of the operating member 13.

The operating member 13 is formed with a notch 48 disposed adjacent the throughgoing hole 45. The notch 48 serves to receive one end of a wire 49 to be later described. The wire 49, which extends in the operating member 13, as shown in FIGS. 5 and 6, is guided in such a manner that it rides on a wrapped member 50 formed in the operating member 13.

Figure 19:
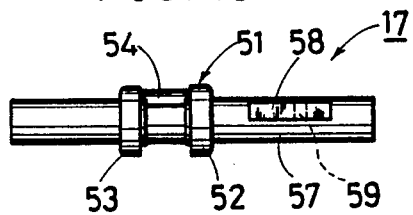
FIGS. 19 through 21 singly show a right-hand side engaging lever 117.
Figure 20:
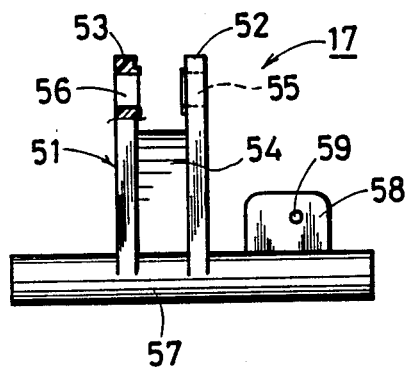
Figure 21:
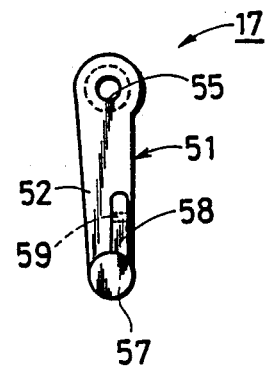
Figure 22:
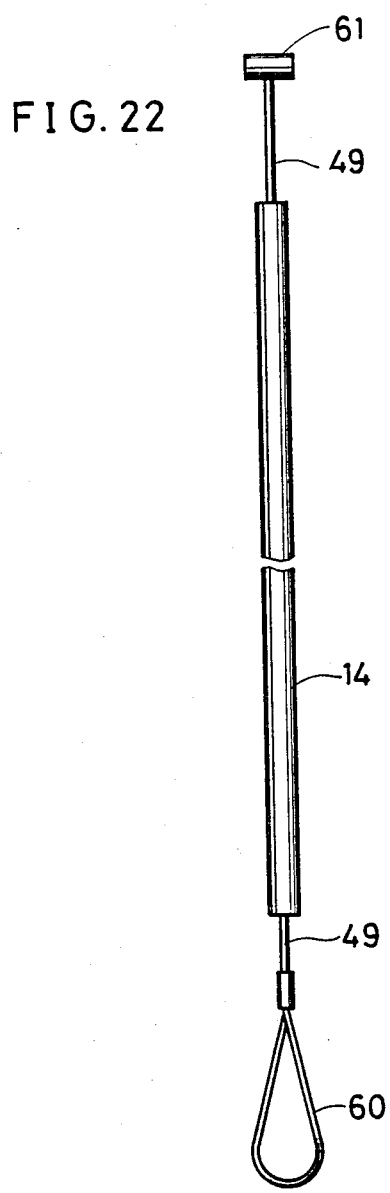
FIG. 22 is a front view showing a wire 49 and a tube 14.

FIGS. 19 through 21 singly show the engaging lever 17. FIG. 19 is a plan view; FIG. 20 is a front view; and FIG. 21 is a right-hand side view.

The engaging lever 17 is positioned as it is held between the walls 18 and 19 of said wheel attaching member 15. More particularly, the enaging lever 17 has a lever portion 51 which is composed of a pair of parallel walls 52 and 53 and a wall 54 interconnecting said walls 52 and 53. The parallel walls 52 and 53 extend beyond the wall 54 disposed therebetween. The projecting portions of these walls 52 and 53 are formed with throughgoing holes 55 and 56, respectively. In the actual assembled state, as shown in FIGS. 5 and 6, the engaging lever 17 is turnably supported on the wheel attaching member 15 by inserting the pin 43 through the throughgoing holes 55 and 56 with the lever portion 51 positioned immediately inside the pair of walls 18 and 19 of the wheel attaching member 15 and with the operating member 13 positioned between the pair of walls 52 and 53 of the lever portion 51.

The front end of the lever portion 51 of the engaging lever 17 terminates in an engaging member 57 which extends at right angles to the lever portion 51. In this example, the engaging member 57 is in the form of a bar having a round cross-section. This engaging member 57 corresponds to the engaging member f described previously with reference to FIG. 2.

As shown in FIGS. 3 through 5, one terminal end of the range of turning movement of the turnably supported engaging lever 17 is defined by the engaging member 57 abutting against a portion of the wheel attaching member 15.

Projecting from the engaging member 57, a spring receiving element 58 is formed. The spring receiving element 58 is formed with a throughgoing hole 59.

In FIG. 22, the wire 49 and tube 14 are shown. The wire 49 is passed through the tube 14, with its opposite ends being exposed as they extend beyond the tube 14. One end of the wire 9 is formed with a loop 60. Further, the other end of the wire 49 has a locking block 61 attached thereto.

The wire 49 is installed so that its end formed with the loop 60 is positioned at the right-hand side wheel stopping mechanism which is being described now. That is, as shown in FIGS. 5 and 6, the loop 61 is attached to the operating member 13 by being engaged with part of the operating member 13 as the loop is received in the notch 48 of the operating member 13.

As shown in FIG. 4, a locking spring 62 is connected between the spring receiving shaft 46 of the operating member 13 and the spring receiving element 58. In this example, the locking spring 62 is a coiled tension spring. One end of the locking spring 62 is fitted in a groove 63 (FIGS. 14 and 16) formed in the spring receiving shaft 46, while the other end of the locking spring 62 is inserted in the throughgoing hole 59 formed in the spring receiving element 58.

By the action of the locking spring 62, the operating member 13 and engaging lever 17 are urged to turn in opposite directions across their dead position. For example, in the state shown in FIG. 4 which corresponds to the state shown in FIGS. 3 and 5, the locking spring 62 is extended in a position on one side of the pin 43 which commonly supports the operating member 13 and engaging lever 17 with respect to the wheel attaching member 15; that is, it is extended in a position deviated to the forward side of the baby carriage. Therefore, the forces exerted by the locking spring 62 on the operating member 13 and engaging lever 17 tend to turn the operating member 13 clockwise and the engaging lever 17 counterclockwise in FIG. 4. Since the terminal ends of turning movement of the operating member 13 and engaging lever 17 under the action of the locking spring 62 are defined by their respective abutting against portions of the wire guide member 16 and wheel attaching member 15, as previously described, the respective attitudes of the operating member 13 and engaging lever 17 are held stable by the action of the locking spring 62.

When the operating member 13 is tilted rearwardly of the baby carriage, as shown in FIG. 6, the locking spring will in the initial stage resist such turning of the operating member 13 but as soon as the dead position is passed across it will urge the operating member 13 to turn rearward. That is, as the direction in which the locking spring 62 extends is diagrammatically shown in a dash-dotted line in FIG. 6, the locking spring 62 is positioned rearwardly of the pin 43. Therefore, in the state of FIG. 6 also, the operating member 13 and engaging lever 17 are urged by the action of the locking spring 62 to move toward each other or turn in opposite directions. In addition, in the state of FIG. 6, though not clearly shown, the engaging member 57 abuts against a portion of the wire guide member 16, whereby the terminal end of its counterclockwise movement is defined. Further, the operating member 13 abuts against a portion of the engaging lever 17, whereby the terminal end of its clockwise movement is defined. Thus, another stable state for the turned attitude of each of the two parts, the operating member 13 and the engaging lever 17, is obtained.

In addition, the dead position of the operating member 13 and engaging lever 17 in turning motion is a position they assume when the locking spring 62 overlies the pin 43.

As shown in FIGS. 3 through 6, the outer and inner rear wheels 9 and 10 are formed with respective pluralities of spokes 64 and 65. These spokes 64 and 65 have portions different in height projecting from the inner lateral surfaces of the rear wheels 9 and 10, said portions being radially distributed. In this embodiment, the outward portions of the spokes 64 and 65 project higher than the inward portions thereof. This condition is substantially the same as that shown in FIG. 2. The higher projecting portions of the spokes 64 and 65 serve as ribs 66 and 67 adapted for engagement with the aforesaid engaging member 57. These ribs 66 and 67 are substantially the same in shape as the ribs d and e shown in FIG. 2. Therefore, portions other than the ribs 66 and 67 do not engage the engaging member 57.

Referring mainly to FIGS. 3 through 6, the operation of the right-hand side wheel stopping mechanism will now be described.

FIGS. 3 through 5 show the wheel rotation permitted state, and FIG. 6 shows the wheel stopped state. In FIGS. 3 through 5, the operating member 13 is in a relatively forwardly tilted position. The engaging lever 17 is urged by the action of the locking spring 62 in a direction which causes the engaging member 57 to move toward the axle 28 until it abuts against a portion of the wheel attaching member 15. In addition to such action of the locking spring 62, a return spring to be later described acts in a direction which pulls the wire 49 from the right-hand side wheel stopping mechanism to the left-hand side wheel stopping mechanism; thus, the state shown in FIGS. 3 through 5 is maintained by the combined action of the locking spring 62 and return spring. The engaging member 57 is now positioned away from the ribs 66 and 67, so that there is no possibility of its engaging the ribs 66 and 67 as the rear wheels 9 and 10 are rotated.

In such state if the operator imparts a backward force to the operating member 13 by pressing the wall 47 of the operating member 13 by the foot, the state shown in FIG. 6 is obtained. That is, the operating member 13 and operating lever 17 are stabilized in the state of FIG. 6 by the action of the locking spring 62 after they have passed across their dead position. At this time, the wire 49 is in the state of riding on the wrapped portion 50 formed on the operating member 13, in which state the wire is taken into the right-hand side wheel stopping mechanism by a predetermined length. In addition, such movement of the wire is effected against the force of the aforesaid return spring. In this sense, the strength of the locking spring 62 is selected greater than that of the return spring.

In the state of FIG. 6, the engaging member 57 of the engaging lever 17 is positioned in the outward portions of the rear wheels 9 and 10. That is, the opposite ends of the engaging member 57 are now in a position to engage the ribs 66 and 67 as the rear wheels 9 and 10 are rotated. Therefore, free rotation of the wheels 9 and 10 is prevented.

In the wheel stopped state shown in FIG. 6, if the operating member 13 is operated again for a forward tilt, the wheel rotation permitted state shown in FIGS. 3 through 5 will be obtained.

The movement of the operating member 13 described above is transmitted to the left-hand side wheel stopping mechanism through the wire 49. This left-hand side wheel stopping mechanism will now be described with reference to FIG. 23 and the following.

Figure 23:
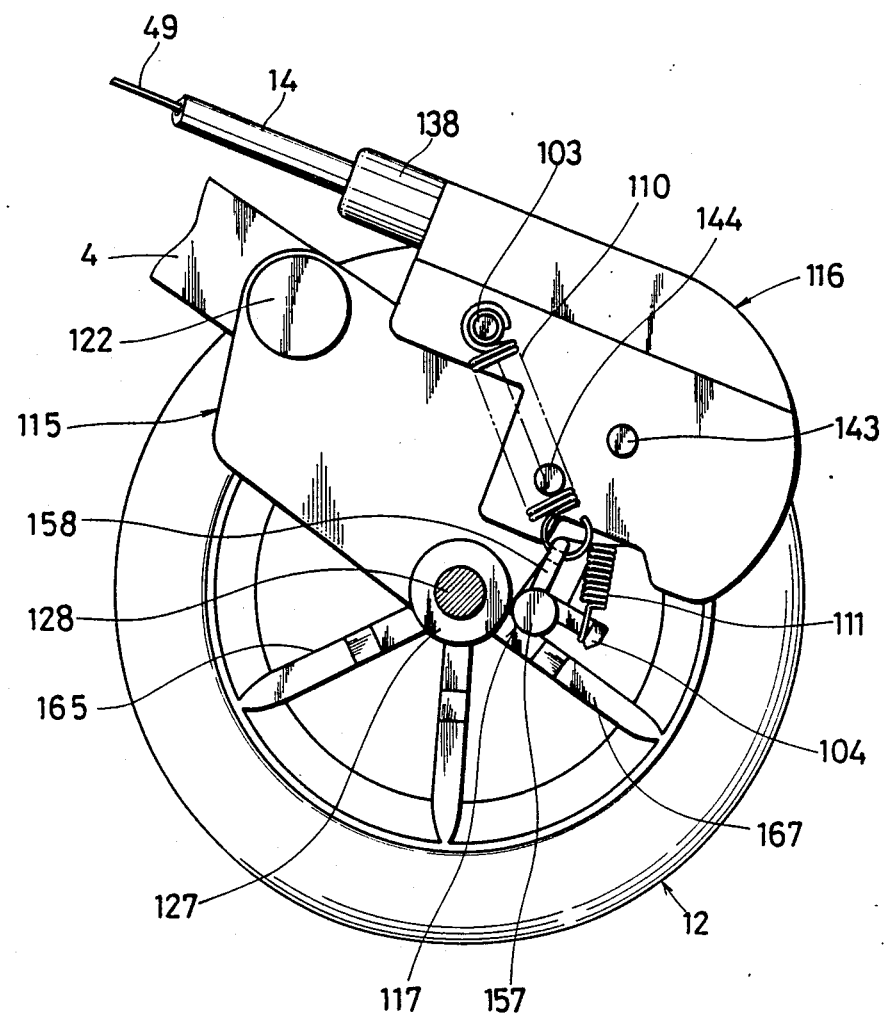
FIGS. 23 through 26 show a left-hand side wheel stopping mechanism installed in connection with left-hand side rear wheel means 8.
Figure 24:
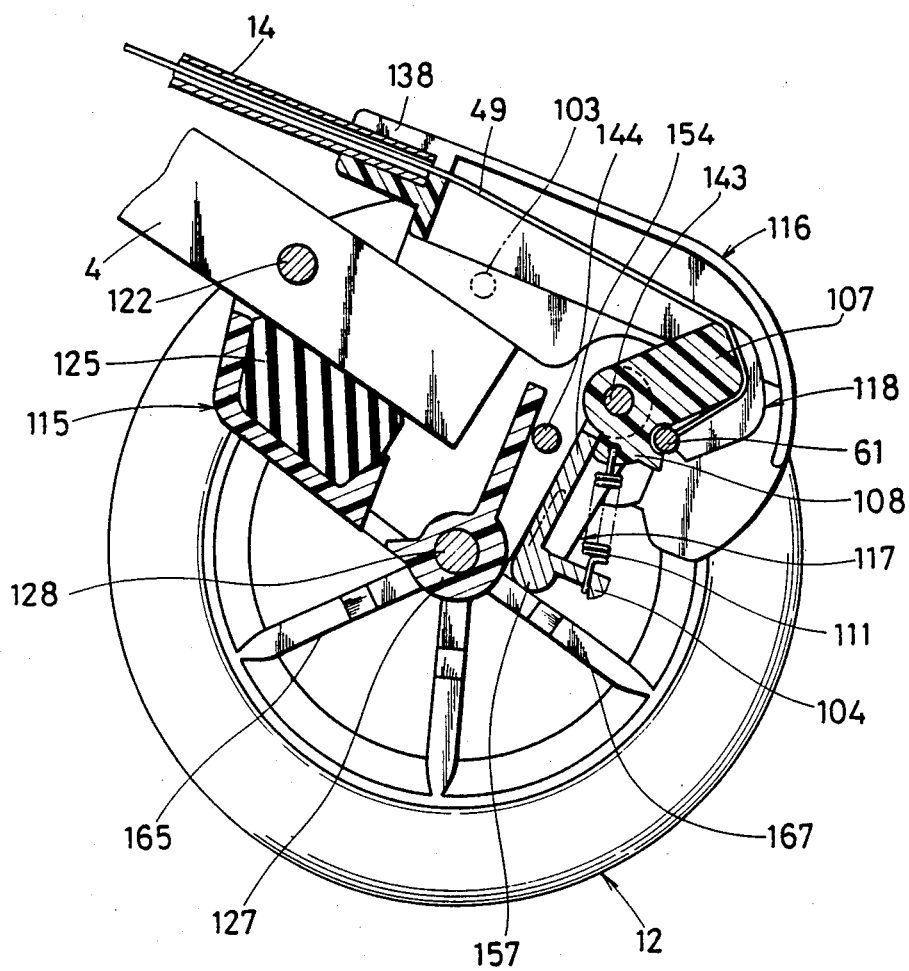
Figure 25:
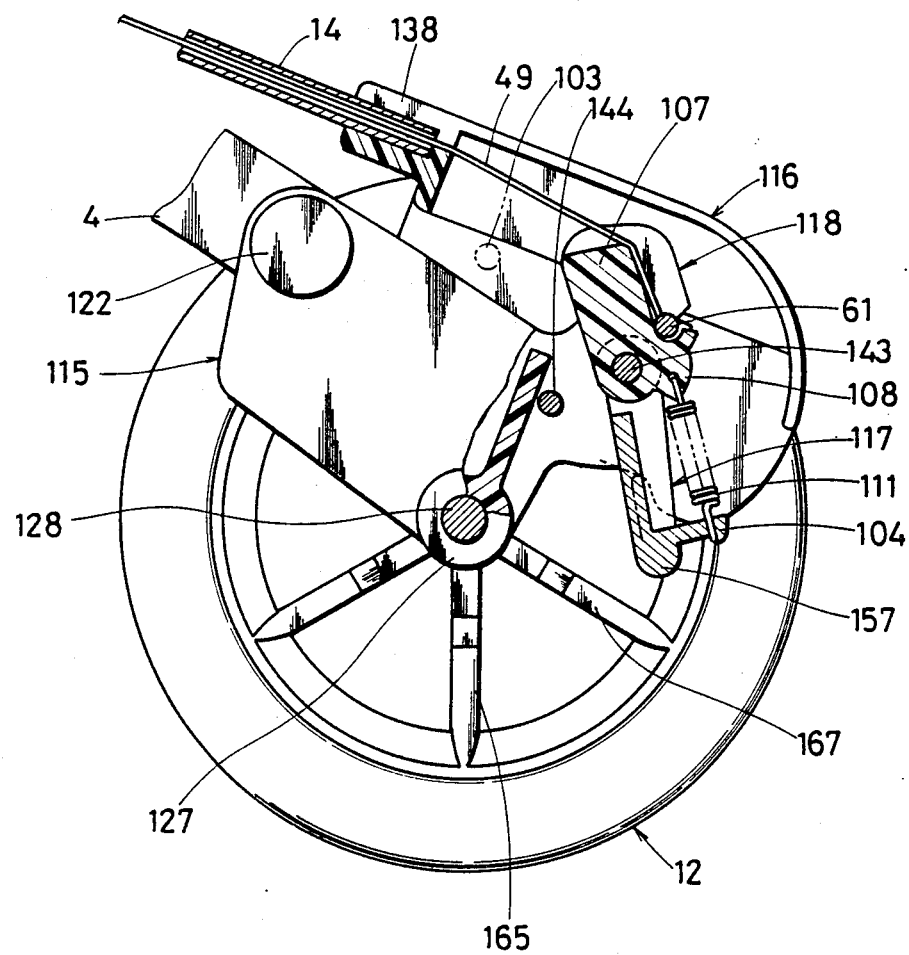
Figure 26:
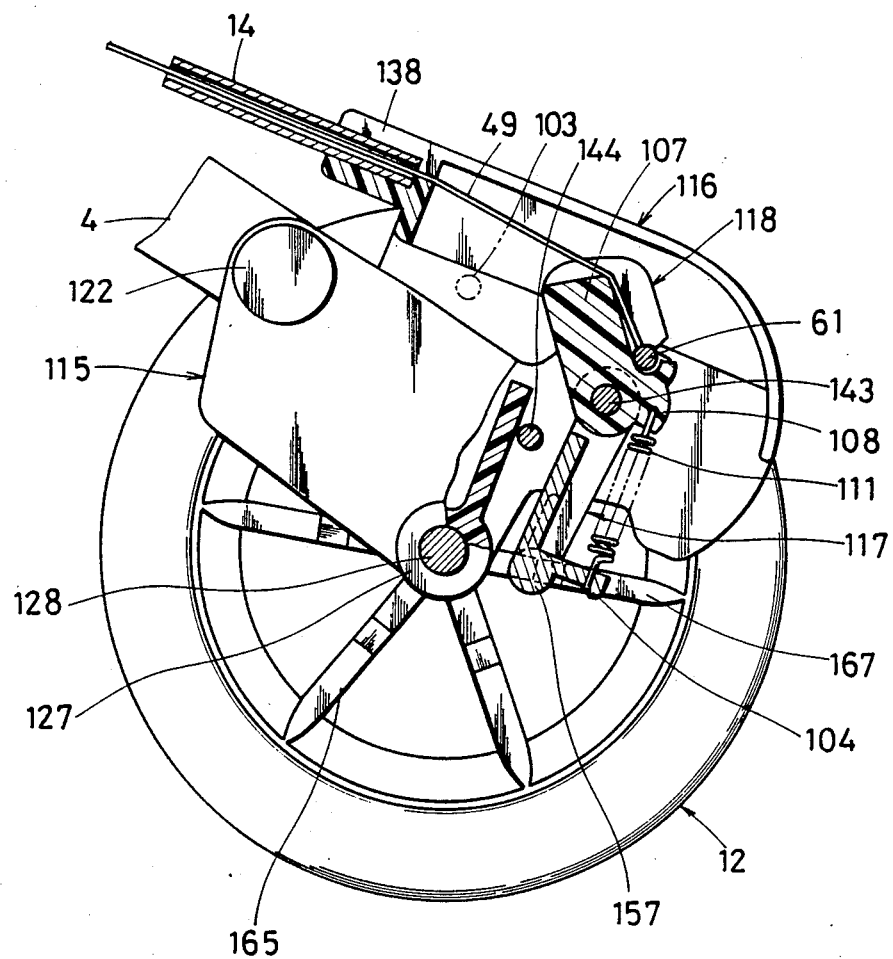

In FIGS. 23 through 26, the left-hand side wheel stopping mechanism is shown with the outer rear wheel 11 of FIG. 1 removed. FIGS. 23 and 24 show the wheel rotation permitted state and FIG. 25 shows the wheel stopped state. FIG. 26 shows a state, which occurs in a special case, on the way from the wheel rotation permitted state to the wheel stopped state.

The left-hand side wheel stopping mechanism comprises, as main components, a wheel attaching member 115 attached to the left-hand side rear wheel 4, a wire guide member 116, an engaging lever 117, and a connecting lever 118, said components 116 through 118 being held by said wheel attaching member.

The wheel attaching member 115 is symmetric with respect to the right-hand side wheel stopping mechanism shown in FIGS. 7 through 10. Thus, single illustrations are omitted. The left-hand side wheel attaching member 115, like the right-hand side wheel attaching member 15, is turnably supported on the lower end of the rear leg 4 by a pin 122. And a cushion member 125 as shown in FIG. 24 is disposed between the rear leg 4 and the wheel attaching member 115 to provide a cushioning effect between the rear leg and the rear wheels 11, 12.

A bearing portion 127 formed on the wheel attaching member 115 has an axle 128 inserted therethrough. The axle 128 rotatably supports at its opposite ends the outer and inner rear wheels 11 and 12.

The left-hand side wire guide member 116 is singly shown in FIGS. 27 through 29. FIG. 27 is a left-hand side view; FIG. 28 is a front view; and FIG. 29 is a bottom view.

The left-hand side wire guide member 116, as is clear from a comparison with the right-hand side wire guide member 16, is similar in shape as member 16. Formed in the same manner as in the right-hand side wire guide member 16, are walls 135, 136, a front wall 136, a socket portion 138, and throughgoing holes 139, 140, 141 and 142. The differences in arrangement are as follows.

First, since no member corresponding to the aforesaid operating member 13 is provided in connection with the wire guide member 116, the upper surface of the wire guide member 116 is closed by an upper wall 101. A slit 102 is formed which extends from a socket portion 138 to the upper wall 101 so as to facilitate reception of the wire 49 in the wire guide member 116. Further, a spring receiving shaft 103 is formed which projects outward from a wall 136.

The wire guide member 116 is fixed to the wheel attaching member 115 by holding the latter between its pair of walls 135 and 136 and inserting pins 141 and 142 through throughgoing holes 139, 140 and 141, 142.

Figure 30:
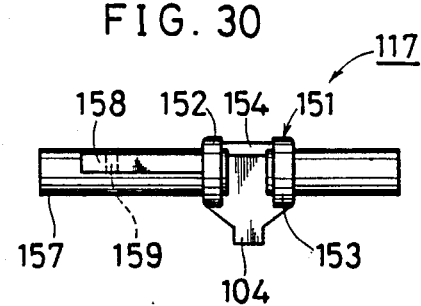
FIGS. 30 through 32 singly show the left-hand side engaging lever 117.
Figure 32:
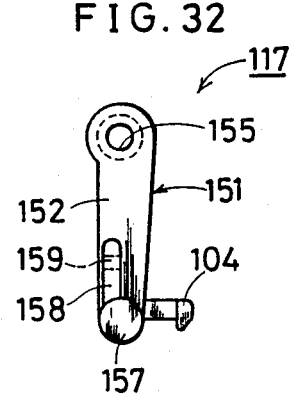
Figure 31:
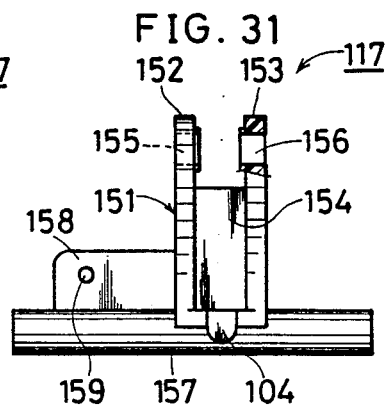

The engaging lever 117 is singly shown in FIGS. 30 through 32. FIG. 30 is a plan view; FIG. 31 is a front view; and FIG. 32 is a left-hand side view.

The left-hand side engaging lever 117 has a shape which is symmetric with respect to the right-hand side engaging lever 17, as a whole. That is, the left-hand side engaging lever 117, like the right-hand side engaging lever 17, has a lever portion 151, walls 152, 153 and 154, throughgoing holes 155 and 156, a spring receiving element 158, and throughgoing holes 159.

The engaging lever 117 is also formed with a spring receiving hook 104 projecting from the end of the lever portion 151. Further, the spring receiving element 158 formed on the engaging lever 117 extends to the lever portion 151.

The left-hand side engaging lever 117, like the right-hand side engaging lever 17, is attached to the wheel attaching member 115 by a pin 143 extending through the throughgoing holes 155 and 156 in such a manner that it is turnably within a predetermined range. One terminal end of the range of turning movement of the engaging lever 117 is defined by the engaging member 157 abutting against a portion of the wheel attaching member 115, as shown in FIGS. 23 and 24. The other terminal end of the range of turning movement of the engaging lever 117, as can be seen from FIG. 25 by analogy, is defined by the spring receiving element 158 abutting against a portion of the wire guide member 116.

Figure 36:
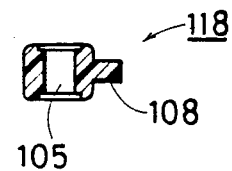
FIGS. 33 through 36 singly show a connecting lever 118.
Figure 33:
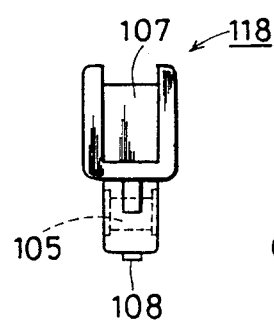
Figure 34:
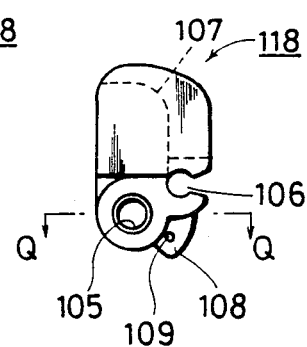
Figure 35:
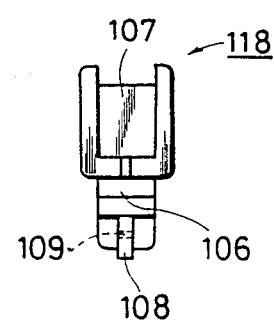

In FIGS. 33 through 36, the connecting lever 118 is singly shown. FIG. 33 is a left-hand side view; FIG. 34 is a font view; FIG. 35 is a right-hand side view; and FIG. 36 is a sectional view taken along the line Q—Q in FIG. 34.

The connecting lever 118, as considered from the position where it is installed, corresponds to the right-hand side operating member 13. That is, the connecting lever 118 is positioned between the pair of walls 152 and 153 of the engaging lever 117. It has a throughgoing hole 105 to receive the pin 143 therein. That connecting lever 118 is turnably supported on the wheel attached member 115 by said pin 143.

The connecting lever 118 serves to receive one end of the wire 49. That is, it has a notch 106 for receiving a locking block 61 provided on one end of the wire 49. It also has a wrapped portion 107 for wrapping the wire which extends from the locking block 106 received in the notch 106.

Further, the connecting lever 118 is formed with a spring receiving element 108 which has a throughgoing hole 109 formed therein.

Further, the left-hand side wheel stopping mechanism has attached thereto a return spring 110 as shown in FIG. 23 and an overtension accommodating spring 111 as shown in FIGS. 23 through 26. In this example, these springs 110 and 111 are coiled tension springs.

The return spring 110 is installed in such a manner that one end thereof is engaged by the spring receiving shaft 103 formed on the wire guide member 116 and the other end thereof is inserted in the throughgoing hole 159 formed in the spring receiving element 158 of the engaging lever 117.

The overtension accommodating spring 111, which serves to accommodate overtension in the wire 49, is installed in such a manner that one end thereof is engaged by the spring receiving hook 104 of the engaging lever 117 and the other end thereof is inserted in the throughgoing hole 109 formed in the spring receiving element 108 of the connecting lever 118.

For example, as shown in FIG. 24, the overtension accommodating spring 111 urges the connecting lever 118 to turn clockwise around the axis of the pin 143 relative to the engaging lever 117. The return spring 110 urges the engaging lever 117 to turn counterclockwise around the axis of the pin 143 relative to the wire guide member 116, i.e., the wheel attaching member 115. As a result of the urging actions of these two springs 110 and 111, the engaging lever 117 is stabilized in a state in which the engaging member 157 abuts against a portion of the wheel attaching member 115, while the connecting lever 118 is stabilized by the spring receiving element 108 abutting against the wall 154 of the engaging lever 117. The tensile forces of these springs 110 and 111 are finally imparted to the connecting lever 118 and emerge as forces tending to draw the wire 49 into the left-hand side wheel stopping mechanism.

The rear wheels 11 and 12 forming the left-hand side rear wheel means 8, like the rear wheels 9 and 10 forming the right-hand side wheel means 7 shown in FIGS. 3 through 6, are provided with respective pluralities of spokes. Referring to the inner rear wheel 12 shown in FIGS. 23 through 26, spokes 165 are formed thereon. The outward approximately half portions of these spokes 165 project higher than the remaining portions from the inner lateral surface of the rear wheel 112, thus forming ribs 167 engageable with the engaging member 157. The outer rear wheel 11 is likewise formed with spokes and ribs, not shown.

Referring mainly to FIGS. 23 through 26, the operation of the left-hand side wheel stopping mechanism will now be described.

FIGS. 23 and 24 shown the wheel rotation permitted state which is established simultaneously with the state shown in FIGS. 3 through 5 associated with the right-hand side wheel stopping mechanism. In this state, the engaging member 157 is in a radially innermost position toward the center of the rear wheel 12 (and the rear wheel 11). Therefore, the engaging member 157 is not capable of engaging the ribs 167 (and the ribs on the outer rear wheel 11), and hence the rear wheels 11 and 12 can be freely rotated.

FIG. 25 shows the wheel stopped state which is established simultaneously with the state shown in FIG. 6 associated with the right-hand side wheel stopping mechanism described previously. In FIG. 6, as a result of the rearward turning of the operating member 13, the wire 49 has been drawn into the right-hand side wheel stopping mechanism by a predetermined length. In FIG. 25, by an amount corresponding to the amount of this movement, the connecting lever 118 is turned counterclockwise around the axis of the pin 143. In response thereto, the overtension accommodating spring 111 turns the engaging lever 117 counterclockwise around the axis of the pin 143 against the resilience of the return spring 110. The terminal end of this turning movement, as described previously, is defined by the spring receiving element 158 of the engaging lever 117 abutting against a portion of the wire guide member 116. Therefore, the engaging member 157 enters the path of travel of the ribs 167 (and the ribs of the outer rear wheel 11) which move with the rotation of the rear wheel 11 and 12; thus, a state is established in which it can engage these ribs.

In the case of changing the wheel stopped state shown in FIG. 25 back to the wheel rotation permitted state shown in FIGS. 23 and 24, the operation of the operating member 13 described above is involved. When the operating member 13 is brought back again to the state shown in FIGS. 3 through 5, the wire 49 is moved toward the left-hand side wheel stopping mechanism by the action of the return spring 110. Therefore, the wheel rotation permitted state as shown in FIGS. 23 and 24 is obtained again.

During said movement from the wheel rotation permitted state to the wheel stopped state, there may be some obstacle or other in the range of movement of the engaging member 157. For example, depending upon the angle of rotation of the rear wheels 11 and 12, it may happen that the movement of the engaging member is interfered with by a rib 167 (or a rib on the outer rear wheel 11). In this case, if the end of the wire 49 were directly connected to the engaging lever 117, an excessive tension would be imparted to the wire 49, with the engaging lever 117 rendered unable to move throughout its range of movement. This embodiment, however, is so arranged that the force from the wire 49 is imparted first to the connecting lever 118 and then it is transmitted to the engaging lever 117 through the overtension accommodating spring 111. Therefore, in the case where the engaging member 157 colliding with a rib 167, for example, which interferes with its movement, the connecting lever 118 alone turns thoroughly under the tension in the wire 49 but the amount by which the engaging lever 117 fails to follow it is accommodated by the elongation of the overtension accommodating spring 111. At this time, since the engaging lever 117 is constantly urged by the overtension accommodating spring 111 to follow the connecting lever 118, if the rear wheel 12 is slightly rotated to remove the rib 167 from the range of movement of the engaging member 157, then the state shown in FIG. 25 is instantly established.

If the engaging lever 117 is connected to the wire 49 through the overtension accommodating spring 111, as described above, the following merit can also be expected. An arrangement is obtained in which the movement of the operating member 13 installed in the right-hand side wheel stopping mechanism is transmitted to the left-hand side wheel stopping mechanism through the wire 49. In this case, the range of movement of the left-hand side engaging member 157, simply considered, would be correlated to the amount of movement of the wire 49. Thus, if the actual product obtained conforms to the engineering design, the engaging member 157 can be moved within the proper range. In the actual manufacturing process, however, it is not easy to attain accuracy, particularly in determining the length of the wire 49 or the length of the tube 14. For example, if the wire 49 produced is longer or shorter than planned at the design stage, the engaging member 157 may move in a range which is deviated from the desired one. Further, even if it is produced exactly as designed, the wire 49 can elongate because of fatigue during repeated use, resulting in a similar difficulty.

Thus, as in the embodiment, where the overtension accommodating spring 111 is used, it is preferable that the length of the wire be less than the designed value. In the case where it is so shortened, in the state of FIG. 25, for example, the connecting lever 118 only turns further counterclockwise while elongating the overtension accommodating spring 111, not influencing the movement of the engaging lever 117. Moreover, where the length of the wire 49 is less than the designed value, even if it is elongated because of fatigue, such elongation is offset so that the length of the wire is brought closer to the designed value.

In addition, in the case where the length of the wire 49 is less than the designed value, in the wheel rotation permitted state, it may happen that the engaging member 157 remains out of contact with the wheel attaching member 115. However, this will little matter in practice since usually there is some distance left to be traveled before the engaging member engages a rib 167, for example.

While the invention has so far been described in connection with a preferred embodiment thereof, this embodiment can be changed.

For example, while the operating member 13 and the engaging lever 17 have been supported on the common pin 43, they may be turnably supported on separate shafts.

Further, the wire 49 and the overtension accommodating spring 111 may be directly connected together without using the connecting lever 111 while using a suitable pulley for wrapping the wire 49 therearound.

Further, the engineering design may be such that the positions where the ribs 66, 67 and 167 are shifted toward the respective centers of the associated wheels so as to reverse the wheel stopped and wheel rotation permitted states brought about by the turning of the operating member.

While the rear wheel means 7 and 8 have been described as having double wheels 9, 10 and 11, 12, respectively, they may be single wheels.

Further, the springs used in the embodiment have all been coiled tension springs, but by changing their way of attachment it is possible to use coiled compression springs or torsion springs.

Although the present invention has been described and illustrated in detail, it is clearly understood that the same is by way of illustration and example only and is not to be taken by way of limitation, the scope of the present invention being limited only by the terms of the appended claims.

What is claimed is:

1. A wheel stopping device wherein first and second wheel means (8 and 9) turnably installed at two different positions on a movable body through first and second wheel attaching members (115 and 116), respectively, and each having at least one wheel (9, 10, 11, 12) are formed with first and second ribs (167 and 66, 67), respectively, projecting from the lateral surfaces of the wheels, the arrangement being such that when first and second engaging members (157 and 57) respectively associated with said first and second wheel means and installed for movement relative to said wheel attaching members engage said first and second ribs, respectively, the first and second wheel means are brought into a wheel stopped state, while when the first and second engaging members become incapable of engaging the first and second ribs, respectively, the first and second wheel means are brought into a wheel rotation permitted state, said wheel stopping device being characterized in that:

said first and second ribs project from portions of the radii of the respective wheels, said first and second engaging members are respectively formed on the ends of first and second engaging levers (117 and 17) which are respectively installed in said first and second wheel attaching members so that they are turnable within a predetermined range, said first and second engaging members being movable only approximately radially of said wheels by the turning of said first and second engaging levers, said radial movement providing states for engagement with and disengagement from said ribs, a return spring (110) is provided for urging said first engaging member (157) to be positioned at one end of its range of movement, a wire (49) is connected to said first engaging member through a spring (111) which serves to accommodate excessive tension in said wire, in such a manner as to pull said first engaging member toward the other end of its range of movement against the resilience of said return spring, an operating member (13) is attached to said second wheel attaching member (15) so that it is turnable within a predetermined range, said wire extending through a tube (14) which is fixed at its opposite ends to said first and second wheel attaching members, said wire being connected to said operating member, a locking spring (62) is connected between said operating member and said second engaging lever (17), by the action of which locking spring said operating member and said second engaging lever are urged to turn in opposite directions across their dead position, the turning of said operating member and said second engaging lever in one direction under the action of said locking spring is effected against the force of said return spring, while the turning thereof in the other direction is effected with the force of said return spring assisting in such turning, and the relation between said engaging members and said ribs is so selected that the operations for said first engaging member to engage and disengage said first ribs (66, 67) are operatively associated with the operations for said second engaging member to engage and disengage said second ribs (167), respectively.

2. A wheel stopping device as set forth in claim 1, wherein said operating member (13) and said second engaging lever (17) are turnably supported by a common shaft (43).

3. A wheel stopping device as set forth in claim 1, wherein the end (61) of said wire (49) associated with said first engaging member (157) is attached to a connecting lever (118) turnably installed on said first wheel attaching member (115), said overtension accommodating spring (111) being connected between said connecting lever and said first engaging lever.

4. A wheel stopping device as set forth in claim 3, wherein said operating member (13) and said connecting lever (118) are respectively formed with portion (107) for wrapping said wire (49) therearound, and said wire is pulled by the turning of said operating member and connecting lever in such a manner that the wire rides on said wrapped portions.

5. A wheel stopping device as set forth in claim 1, wherein said first and second wheel means (8 and 7) are provided with two parallel wheels (11, 12 and 9, 10), and said first and second engaging members (157 and 57) are each positioned between two parallel wheels, said ribs (167, 66, 67) projecting from the inner lateral surfaces of said parallel wheels.

6. A wheel stopping device as set forth in claim 1, wherein said ribs (167, 66, 67) are provided on the outer portions of the radii of the associated wheels.

7. A wheel stopping device as set forth in claim 1, wherein when said first and second engaging members (157 and 57) are moved against the resilience of said return spring (110), the rotation permitted state is obtained.

8. A wheel stopping device as set forth in claim 1, wherein said wheels (9, 10, 11, 12) are formed with respective pluralities of spokes (64, 65, 165), said spokes having portions different in height projecting from the lateral surfaces of the wheels, said portions being radially distributed, and wherein the portions projecting relatively higher serve as said ribs (66, 67, 167).

9. A wheel stopping device as set forth in claim 1, wherein said tube (14) is flexible.

10. A wheel stopping device as set forth in claim 1, wherein said movable body is a baby carriage.

11. A wheel stopping device as set forth in claim 10, wherein said first and second wheel means form rear wheels (8, 9) attached to the lower ends of the two rear legs of said baby carriage.

12. A wheel stopping device as set forth in claim 11, wherein said wheel attaching members (15, 115) are attached to said rear wheels (3, 4) through cushion means (25, 125).

* * * * *